US012762567B2

(12) United States Patent
Lim et al.

(10) Patent No.: US 12,762,567 B2
(45) **Date of Patent: *Oct. 13, 2026**

(54) MACHINE LEARNING ENGINE USING FOLLOWING LINK SELECTION

(71) Applicant: PayPal, Inc., San Jose, CA (US)

(72) Inventors: Chern Jie Lim, Singapore (SG); Ziyuan Pan, Singapore (SG); Jessica Tjong, Singapore (SG); Oscar Charles Edward Sanderson, Singapore (SG); Yanfei Dong, Singapore (SG)

(73) Assignee: PAYPAL, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/978,965

(22) Filed: Dec. 12, 2024

(65) Prior Publication Data

US 2025/0225523 A1 Jul. 10, 2025

Related U.S. Application Data

(63) Continuation of application No. 17/563,218, filed on Dec. 28, 2021, now Pat. No. 12,190,324, which is a (Continued)

(51) Int. Cl.

*G06Q 20/40* (2012.01)
*G06F 16/955* (2019.01)

(Continued)

(52) U.S. Cl.

CPC ..... *G06Q 20/4016* (2013.01); *G06F 16/9566* (2019.01); *G06N 20/00* (2019.01);

(Continued)

(58) Field of Classification Search

CPC .... G06Q 20/00–425; G06F 16/00–986; G06F 21/00–88; G06N 20/00–20; H04L 63/00–308

See application file for complete search history.

(56) References Cited

U.S. PATENT DOCUMENTS

| | | | | |
|---|---|---|---|---|
| 9,015,066 B2 * | 4/2015 | Scipioni | ............... | G06Q 20/387 705/21 |
| 9,349,123 B1 * | 5/2016 | McNamara | ............. | H04L 67/10 |

(Continued)

OTHER PUBLICATIONS

International Appl. No. PCT/US2018/068039, International Preliminary Report on Patentability mailed Mar. 26, 2019, 10 pages.

(Continued)

*Primary Examiner* — Chenyuh Kuo
(74) *Attorney, Agent, or Firm* — Haynes and Boone, LLP

(57) ABSTRACT

A machine learning engine may be trained using artificial intelligence techniques and used according to techniques discussed herein. While an initial electronic transaction for a resource may be permitted, a subsequent related transaction to the initial electronic transaction may be analyzed in view of additional electronic information that was not available at the time of the initial transaction. Analysis of the subsequent related transaction, using the machine learning engine, may indicate a new classification related to the resource and/or the acquisition of the resource. Based on this new classification, usage of the resource may be restricted and/or denied, and the initial transaction for the resource may even be canceled retroactively.

20 Claims, 5 Drawing Sheets

FIG. 1

Related U.S. Application Data continuation of application No. 15/857,432, filed on Dec. 28, 2017, now Pat. No. 11,288,672.

(51) Int. Cl.

| | |
|---|---|
| ***G06F 21/31*** | (2013.01) |
| ***G06N 20/00*** | (2019.01) |
| ***G06Q 20/34*** | (2012.01) |
| ***H04L 9/40*** | (2022.01) |

(52) U.S. Cl.

CPC ....... *G06Q 20/351* (2013.01); *H04L 63/1425* (2013.01); *H04L 63/1483* (2013.01); *G06F 21/31* (2013.01)

(56) References Cited

U.S. PATENT DOCUMENTS

| | | | | |
|---|---|---|---|---|
| 9,380,065 | B2 | 6/2016 | Jenson | |
| 9,886,175 | B1 * | 2/2018 | Cox | G06F 9/451 |
| 11,170,375 | B1 * | 11/2021 | Kramme | G06Q 20/24 |
| 12,190,324 | B2 * | 1/2025 | Lim | G06N 5/01 |
| 2005/0230473 | A1 | 10/2005 | Fajkowski | |
| 2006/0004853 | A1 * | 1/2006 | Danninger | G06F 16/972 |
| 2008/0301019 | A1 | 12/2008 | Monk | |
| 2013/0024375 | A1 * | 1/2013 | Choudhuri | G06Q 20/4016 705/44 |
| 2013/0117646 | A1 | 5/2013 | Hansen et al. | |
| 2014/0189808 | A1 | 7/2014 | Mahaffey et al. | |
| 2014/0351117 | A1 | 11/2014 | Tran | |
| 2015/0039513 | A1 | 2/2015 | Adjaoute | |
| 2015/0073981 | A1 * | 3/2015 | Adjaoute | G06Q 20/4016 705/39 |
| 2016/0005029 | A1 | 1/2016 | Ivey et al. | |
| 2016/0180068 | A1 | 6/2016 | Das et al. | |
| 2016/0307201 | A1 * | 10/2016 | Turgeman | G06Q 20/4016 |
| 2017/0161781 | A1 * | 6/2017 | Parekh | G06Q 20/351 |
| 2018/0165675 | A1 * | 6/2018 | Isaacson | G06Q 20/342 |
| 2019/0026726 | A1 * | 1/2019 | Yankovich | G06Q 20/3223 |
| 2019/0130387 | A1 * | 5/2019 | Arora | G06Q 10/067 705/318 |
| 2022/0309511 | A1 * | 9/2022 | Metnick | G06Q 20/401 |

OTHER PUBLICATIONS

International Appl. No. PCT/US2018/068039, International Search Report and Written Opinion mailed Mar. 26, 2019, 10 pages.

Tuyls K., et al., "Credit Card Fraud Detection Using Bayesian and Neural Networks," May 22, 2015, Retrieved from Internet URL: https://www.researchgate.net/publication/2524707_Credit_Card_Fraud_Detection_Using_Bayesian_and_Neural_Networks, 8 pages.

White R., "How Computers Work", Illustrated by Timothy Edward Downs, Que Publishing, 7th Edition, Oct. 15, 4 2003, 23 pages.

* cited by examiner

MACHINE LEARNING ENGINE USING FOLLOWING LINK SELECTION

CROSS REFERENCE TO RELATED APPLICATIONS

The present application is a continuation of U.S. patent application Ser. No. 17/563,218, filed Dec. 28, 2021, which is a continuation application of U.S. patent application Ser. No. 15/857,432, filed Dec. 28, 2017, now U.S. Pat. No. 11,288,672, and are incorporated in reference in their entirety.

TECHNICAL FIELD

The present application generally relates to machine learning and artificial intelligence technology that relates to fraud assessment and risk detection during online navigation events and link selection through electronic devices, and more specifically to a machine learning engine for fraud assessment during navigation processes based on device characteristics, account actions, and assessment feedback, according to various embodiments.

BACKGROUND

Various types of service providers may provide electronic transaction processing services to users, merchants, other types of businesses, and different entities.

Figure 1:
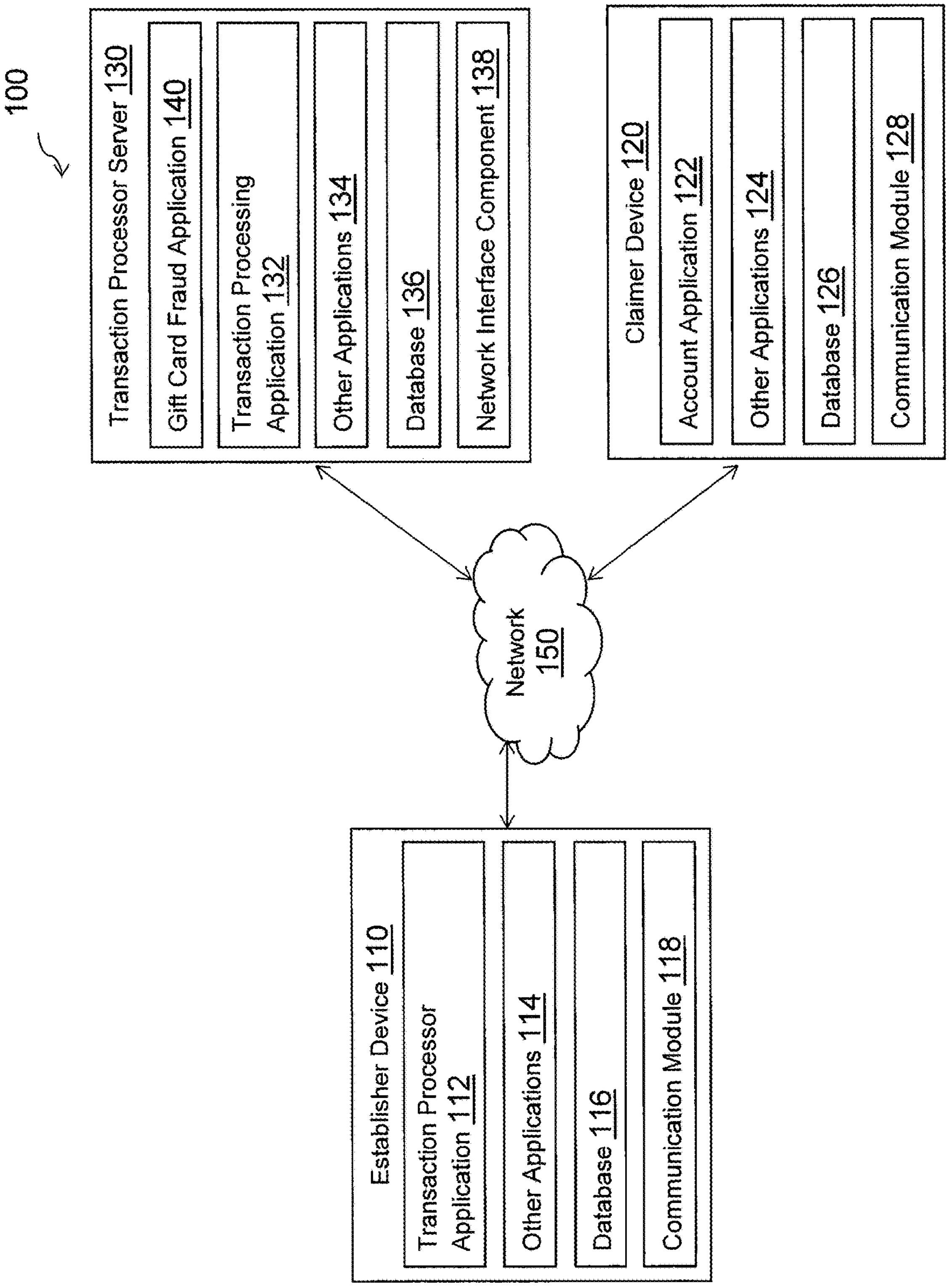
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for a machine learning engine for fraud detection following link selection. Systems suitable for practicing methods of the present disclosure are also provided.

Service providers may provide digital gift card services, and/or processing services for digital gift giving by other merchants or marketplaces. Digital gift cards generally can be generated for a value, or allow a user to provide another form of online, digital currency, which may be redeemed by navigating to an online redemption resource that allows for a device to access the value and/or use the value for electronic transaction processing. However, digital gift cards may be easily created with values fraudulently from accounts that are comprised and with values that do not belong to the user creating the gift card and/or redeeming the gift card. For example, because digital gift cards can be created electronically over a network, a malicious user may utilize an unauthorized account that the malicious user has gained access to and/or taken over to create a digital gift card. Moreover, unlike physical gift cards, redemption processes and data for digital gift cards may be distributed to multiple users, users that are acting in concert with a malicious user taking over an account, and/or fraudulently accessed by other malicious users where a recipient's account that initially rightfully receives a digital gift card becomes compromised. Although some systems attempt to determine whether a digital gift card has been fraudulently purchased, created, and/or generated, for example, from a compromised account, these systems do not examine potential fraud at the time of execution of a redemption process and/or navigation to an interface to access and use the value of the digital gift card. Thus, although some digital gift cards may appear to be validly created at the time of creation, later data of a device or account at the time the device attempts to access the redemption process may show the device is acting fraudulently.

One or more entities, such as personal users or consumers, groups of users, merchants, businesses, or other commercial or governmental agencies, may wish to provide funds to another user over a network, including currency value as well as virtual values, items, or benefits. For example, a first user may wish to purchase a digital or virtual gift card for a second user that provides value to the second user, including transfer of funds to the second user and/or use of funds by the second user that are provided by the first user for use in purchasing items/services or otherwise engaging in electronic transactions. In other embodiments, the first entity may wish to engage in a transfer or earmark funds for a user available for a transfer, which may correspond to a pre-purchased or stored value, such as a value held in escrow for use by the second user. Various service providers may provide transaction processing services that may allow these two or more entities to engage in electronic transaction processing, including establishment and storage of a balance for a value available for use by the second user, generation of the digital gift card or other online electronic data used to provide the value to the second user, communication of the digital gift card to the second user, and redemption/use processes to access and use the available balance. For example, a payment provider or transaction processor service may offer online electronic transaction processing services that provide transfers, payment services, digital gift card generation and redemption/use, and other type of financial services including payment account establishment and/or management. These service providers may further provide additional types of benefits, features, and/or processes to users, such as fraud protection for digital gift cards, as discussed herein. Moreover, the service provider may further provide the discussed processes herein for digital gift cards.

Thus, a service provider may allow for generation of the virtual or digital gift card, which may correspond to data that allows another user from the one establishing the digital gift card to access, redeem, and/or utilize a balance for a value established for the digital gift card. The digital gift card may therefore be created by an account of a first user requesting establishment of the digital card and designating/providing an amount or value for establishment of the digital card. The account may be used to access one or more interfaces and processes of the service provider to submit the request and provide the value used as the balance for the digital card. For example, a graphical user interface of a device used to access the account (e.g., through an authentication process and an account access portal in a website or a dedicated application) may display the interfaces and allow a user to interact with the processes to request establishment of the digital card and provide a value for the card using a payment instrument, digital item, or other virtual object or account that possesses value. The service provider may utilize the request and the designation/provision of the value for the balance of the card to generate the card, which may be generated as executable data that can be stored by the service provider and communicated to one or more device. The executable data for the card may then allow another user to access the balance of the card, redeem and retrieve the balance, and/or utilize the balance during electronic transaction processing.

The service provider may further generate digital card message data and/or other data used to embody the digital card as a virtual item, which may be communicated by the first user's account to one or more other accounts or identifiers, such as an email address, phone number/text message number, online account identifier, or other virtual address or identification location that allows another user to access the digital gift card and attempt to redeem/use the balance of the digital gift card. The first user's account may be used to identify the recipient or claiming second user, or the account of the second user, which may include an account with the service provider. Thus, the digital card may be communicated to the second user's account, as well as any further account, for redemption/use of the account through the data of the digital card. When generating the data used for the digital card, the service provider may provide a navigation link to a process with the service provider to redeem/use the card. The navigation link may correspond to a web link or hyperlink, or may include other executable process to access the balance of the digital card, such as data and/or fields within an interface output by the digital card or a message for the digital card. Additionally, a message, graphics, notes/information for the first user and/or first user's account, or other information may be added to the data for the card.

In order to generate a digital gift card, the first user may further be required to establish the first user's account with the service provider in order to engage in electronic transaction processing and/or digital gift card creation. The first user may be required to provide identification information to establish the account, such as personal information for a user, business or merchant information for such an entity, or other types of identification information including a name, address, and/or other information. The first user may also be required to provide financial information, including payment card (e.g., credit/debit card) information, bank account information, gift card information, and/or benefits/incentives, which may be used to provide the value for the balance of the digital gift card. In order to create an account, the first user may be required to select an account name and/or provide authentication credentials, such as a password, personal identification number (PIN), answers to security questions, and/or other authentication information. Such information is susceptible to discovery and fraudulent/malicious use by other users, including the second user or a user affiliated with the second user to fraudulently generate a digital gift card and fraudulently provide a value to the second user without actual consent from the first user. For example, an account takeover action by a malicious user may discover or otherwise access the first user's account and use the first user's account for fraudulent purchases, transfers, and gift card generation. Similar information as that discussed above may also be provided by the second user receiving a digital card when the second user's account is with the service provider. However, in other embodiments, the second user's account may be external to the service provider, and other data may be used to establish the second user's account.

Once an account is created, the account may be accessed through a web browser from a website of the service provider and/or a dedicated application of the service provider, such as a mobile smart phone application. The first user's account may then be used by the first user, as well as malicious users during an account takeover or other fraudulent access, to perform electronic transaction processing and/or generate a digital gift card with the data discussed above. A token may be issued to the first user for their respective account, where the token may include data (which may be encrypted) allowing the service provider to identify the first user and their account and authenticate the first user. Thus, the token may be transmitted to other entities during transaction processing, which may allow the service provider to identify and authenticate the first user's account and engage in transaction processing. However, where authentication credentials may be compromised, a malicious user may obtain access to the token or may utilize the account absent the token to generate digital gift cards. Additionally, the online payment provider or other service provider may provide digital wallet services, which may offer financial services to send, store, and receive money, process financial instruments, and/or provide transaction histories. In other embodiments, the first user may instead use an online merchant to establish the value balance for a digital gift card and generate the gift card, where the service provider may further provide account services, digital gift card redemption/use, and fraud protection as discussed herein.

A computing device may execute a transaction processing application, which may be configured to send and receive payments to another party, such as another user and/or a merchant, or otherwise engage in transaction processing including generation of digital gift cards. In various embodiments, a website may provide the transaction processing services, and thus may be accessed by a web browser application. The application (or website) may be associated with a payment provider, such as PayPal® or other online payment provider service, which may provide payments and the other aforementioned transaction processing services on behalf of users, merchants, and other entities. The application may execute on the computing device for a user or a merchant, and may provide various functionalities and processes to the user and/or merchant. For example, a user may utilize the application to send and/or receive payments between the user and another user/merchant. For example, the application/website may be used to access an account, such as the first user's account, to provide a payment for a transaction with a user/merchant, transfer money to a family member/friend, engage in a transaction previously generated and provided to the payment application, initiate a transaction with another entity, or perform another process. The application/website may also be used to establish the digital gift card by providing the aforementioned data through one or more processes and/or interfaces of the application/website for the service provider.

Thus, the service provider may receive the aforementioned request and data necessary to establish the digital gift card through the application/website, and may proceed with generating the digital gift card using the data described herein. Once the digital card is generated, data for the digital card may be transmitted to one or more other users, such as the aforementioned second user. The data transmitted to the other user(s) may include the link, selectable option, or other process to access a balance for the digital gift card and redeem/use the balance. Thus, the other user(s) may utilize the data provided in a message or other communication to access the balance for use through executing a navigation event to a process to access the balance. In other embodiments, the other user(s) may utilize another interface or access a process through another pathway, such as accessing a redemption webpage/website/application interface for digital gift cards and entering in an identifier, code, or other authentication or validation credential/information. Thus, one or more other users may attempt to access the balance through a navigation event, click of a link/process interface field, and/or entry of digital gift card information to an interface.

As previously discussed, fraud may occur at the time of generation of the digital gift card, for example, if an account takeover takes place by a malicious user of the first user's account used to create the digital gift card and/or provide the value for the digital card's balance. The account takeover may occur when the malicious user gains fraudulent access to the first user's account and utilizes the first user's account without permission and/or knowledge by the first user. Other types of fraud may also result in fraudulent creation of the digital gift card, without knowledge by the first user, and/or without consent of the first user, such as data manipulation or fraudulent data provision of data used to create a gift card or other possible malicious acts by other users. In various embodiments, a risk and/or fraud assessment may occur at the time of creation of the digital gift card, which may detect whether the first user's account is being used fraudulent. Such processes may utilize data known or accessible at the time of generation of the digital gift card to make an assessment of whether the digital gift card is generated fraudulently, for example, by using known data for the first user's account, the second user's account receiving the digital gift card, and/or transaction data for generation of the digital gift card and provision of the balance for the digital gift card. However, such processes may not consider later developed or obtained data, for example, at the time of access to the digital card's balance and/or redemption/use of the balance for the digital gift card. Thus, such processes may be insufficient to detect fraud at all times during life and use of the digital gift card, for example, when the second user's account is used to attempt to access the digital gift card balance and redeem/use.

When the second user's account (or any additional users' accounts) attempts to access the digital gift card and redeem/utilize the digital gift card, the service provider may execute a risk or fraud assessment and detection engine to determine whether the digital gift card was generated fraudulently and/or is attempting to be redeemed fraudulently during the executable process to redeem the digital gift card. The engine may correspond to a hardware and/or software engine of the service provider that may be executed in response to detecting the navigation event, link/icon/option selection, digital card data input, or other request to execute the process of the service provider to access the digital card and redeem/use the balance. The fraud assessment engine may utilize account and/or device data for the second user's account execution the action to access the digital card and/or the device being used with the second user's account to access the digital card. For example, account data and/or device data may be accessed from known or accessible data to the service provider, including stored account data for account actions and information for the second user's account. The data may also be provided by the device during use of the second user's account and/or retrieved from another online resource providing the second user's account, such as an email hosting service that provides an email account/address that received the data for the digital gift card.

The account and/or device data for the second user's account claiming the digital card may include a number of transactions made by the account, a number of unique claimer IP addresses for devices using the account, a number of gift cards received by the account, a number of days (or other time period as used herein, including seconds, minutes, and/or hours) between access time of the account and order time of the digital gift card, an average number of days since the IP address was first and/or last used by the account (as well as a difference between when the IP address as first and last used by the account), a time since a visitor identification was last used by the account, a geo-location of the account/device and whether the account/device allows identification of the geo-location, whether the account required a high risk account authentication flow to access the account, if an email and name for the account match, a number of logins to an IP address or the account over a time period, if the IP address originates from a safe or risky country, a number of actions and/or rules invoked during a login attempt to the account, and/or if a redirection or authentication challenge is invoked during a login. The data may also include a session IP address, browser language, browser type, browser version, browser input, or a location. Such data may be accessed, updated, and used in real-time as the engine determines the fraud assessment for the processing action to access the digital gift card. Thus, the engine may perform real-time processing of the data to determine a risk or fraud assessment of the second user's account and/or the event or action requesting access to the digital gift card and redemption/use of the digital card's balance. Additionally, the risk of fraud assessment may be based on one or more rules, weights, or processing algorithms to determine the risk score or fraud assessment. Such rules or weights may provide different factors to data when determining the score, so that certain account or device data may indicate more or less risky or potentially fraudulent digital gift card creation and/or access/redemption/use. A threshold score may also be required to be met before the creation/use of the digital gift card is either determined to be safe and therefore allowable, or conversely, whether the creation/use of the digital gift card indicates potential fraud and should be stopped, examined, or flagged for review.

The engine may also use the buyer, payer, or creator account information for the first user's account used to generate the digital gift card and provide the value of the balance when making a fraud assessment of whether a digital gift card is potentially fraudulent and/or being fraudulently accessed or used. This data may also include transaction data for an electronic transaction that creates the digital gift card (e.g., the request for generation of the digital gift card) and/or provides the value for the balance of the card (e.g., through a transfer, purchase of the value, etc.). For example, additional data for the first user's account and/or transaction to generate the digital card and provide the value for the digital card may include a total amount of purchase for the transaction and/or per past transactions in the transaction history, a number of gift cards purchased in the transaction and/or per the past transactions, a number of times a gift card code is accessed by the account and/or other accounts, a number of digital gift cards sent to the same receiver including the second user and/or the second user's account claiming the digital gift card, if the first user's account has a negative balance or has had a negative balance in the past, if the first user and the second user are in the same personal or business group, an Internet speed of the first user's device used to commonly access the first user's account, a total number of times the first user has logged into an IP address and/or used an IP address including for the transaction used to purchase the digital gift card, if the first user's account and/or device has been dormant for a period of time and/or active, a number of unique IP addresses used to access the first user's account and/or by the first user's device, if the IP address used in the transaction to purchase the digital gift card matches the primary country of the first user and/or first user's account, if the first user's account has any account restrictions, and/or if the first user's account has an account takeover restriction and/or account takeover flag. The data may also include session IP address, browser language, browser type, browser version, browser input, or a location.

Other online data may also be accessed and/or used by the engine to make a fraud assessment, as discussed herein. For example, available customer information with other entities, including merchants, may be accessed and/or received, such as fraud indications, payment reliability, past customer history, etc., of the first user and/or the second user. The other online data may include user restrictions placed on the first user and/or the second user with other entities, which may indicate fraud previously engaged in by the first user and/or the second user. The engine may check the validity, security, and fraud indications of the digital gift card creator's account (e.g., the first user's account) at the time of either or both of transmitting the digital gift card to the claimer user (e.g., the second user's account) and/or when the claimer user attempts access and use of the digital gift card. Such data may be determined and/or accessed in real-time based on these processing requests by the engine for fraud assessment. The first user's account may also include negative or bad tagged transaction, which may result from an account takeover reversal of a transaction, or an administrator fraud reversal of the transaction. The transaction that is tagged as bad or negative may be the transaction to purchase the digital gift card by the creator user's account, or may be a separate related or unrelated transaction that may indicate the creator user's account was subject to past fraud. Thus, the logic of the engine for past flagged transactions may look at both flagged and reversed transactions which may be temporally or financially related to the transaction to purchase the digital gift card, which may indicate the digital gift card was purchased fraudulently.

In response to the fraud assessment, the service provider may then execute a navigation action with the second user's device (e.g., in the web browser/dedicated application) based on the processing request provided using the second user's account/device. For example, the second user's account/device may click on a link or option that navigates to a process to access the digital gift card and redeem/utilize the balance of the digital gift card, or may enter digital gift card data to an interface that executes a process to perform the access/use. The fraud assessment may therefore indicate whether the digital gift card was validly purchased (e.g., by the actual account owner) and therefore may be allowed to be used/redeemed by the second user's account, or whether the digital gift card appears to be fraudulently created and provided to the second user's account, such as during an account takeover, and therefore should not be allowed to be used/redeemed by the second user's account. Thus, the fraud assessment may also correspond to whether the second user's account is authorized to access the digital gift card, for example, whether the second user's account was the proper recipient of the digital gift card or whether there was fraud during the transmission of the digital gift card to the second user's account. If the card appears to be validly created and transmitted to the second user's account, the service provider may route or navigate the second user's account to one or more processes and/or interfaces to access the digital gift card and redeem/use the balance, for example, through a transfer and/or electronic transaction processing process.

However, if the digital gift card appears to be fraudulently purchased/transmitted based on the fraud assessment by the engine, the service provider may prevent the second user's account from accessing the digital gift card and redeeming/using the balance. The service provider may navigate the second user's account/device to an interface notifying the second user's account/device of the fraud, which may request additional authentication information to overcome the fraud indication and allow access/use. The service provider may further gather additional account/device information, which may later be used to update the engine with factors used to make fraud assessments. Additionally, the service provider may execute another process to correct the fraud, such as alerting an administrator and/or flagging the digital gift card for an administrator reversal action, or automatically rolling back the digital gift card and reversing the transaction that purchased the digital gift card. The service provider may also receive feedback from the first user's account and/or second user's account, which may indicate whether the fraud assessment was correct or incorrect. For example, if the first user further requests for the transaction to proceed in an authenticated environment, the fraud assessment may be incorrect. However, if the first user requests transaction reversal, refunding, and/or rollback, the fraud assessment may be correct.

Using the feedback, a machine learning process of the service provider's engine may be executed to update parameters and data for the engine, change weights and/or data considerations by the engine, or otherwise update the engine based on the correctness of the fraud assessment. The aforementioned data factors may be updated based on the feedback, as well as changing real-time data, and weights may be adjusted based on the overall value of data points within the engines processing considerations. The engine may also receive metrics for false negative, true negative, false positive, and true positive outcomes of the fraud assessment, and may determine misclassifications of digital gift card access/use based on the outcome results of the fraud assessment. Thus, the engine may determine an accuracy of the engine, which may be used to update data considerations and weights applied to data in the fraud assessment determination. The engine may continue to execute the machine learning process with further fraud assessments to continue updating the engine, which may then be used to provide more accurate fraud assessments based on changing data, parameters, and/or data weights.

Thus, the service provider may utilize real-time data accrued during a navigation event to an executable processes to redeem a digital gift card to make a real-time fraud assessment and decision of whether to allow a device to access an interface and/or process to access/use the digital gift card. This allows fraud assessment to occur at a time prior to completion of processing an electronic transaction with a fraudulently acquired card, and provides increased online protection from security risks imposed by remote data processing and user interaction over a network. This is increasingly necessary with digital gift cards, where in-person identification and authentication is not possible. Thus, when online security risks pose threats to account takeover and remote malicious user use of an account, the systems and processes disclosed herein may provide increased online security and risk prevention.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes an establisher device 110, a claimer device 120, and a transaction processor server 130 in communication over a network 150. Establisher device 110 may be utilized to access the various features available for establisher device 110, which may include processes and/or applications associated with transaction processing for a transaction to purchase a digital gift card and communicate the digital gift card to claimer device 120 for redemption. In other embodiments, other types of value transfers may also be performed between establisher device 110 and claimer device 120, which may similarly be processed and assessed for fraud as discussed herein. During creation, purchase, and/or transfer of the digital gift card by establisher device 110, a fraudulent or malicious acting party may take over an account of another user that the party is not authorized to use. Similarly, a fraudulent party, including the same party as the one using establisher device 110, may utilize claimer device 120 to redeem the gift card. In certain embodiments, establisher device 110 and claimer device 120 may correspond to the same device used by the same fraudulent party. Transaction processor server 130 may provide at least fraud assessment and risk analysis of digital gift card purchase and redemption/use by establisher device 110 and/or claimer device 120 to prevent fraud during a navigation event or executable process request to use the digital gift card. Additionally, the first establisher user and the second claimer user may utilize establisher device 110 and/or claimer device 120, respectively, to establish accounts with transaction processor server 130, where account information for the accounts may further be utilized for digital gift card creation, redemption, and/or fraud assessment.

Establisher device 110, claimer device 120, and transaction processor server 130 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

Establisher device 110 may be implemented as a communication device that may utilize appropriate hardware and software configured for wired and/or wireless communication with claimer device 120, and/or transaction processor server 130. For example, in one embodiment, establisher device 110 may be implemented as a personal computer (PC), telephonic device, a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

Establisher device 110 of FIG. 1 contains a transaction processor application 112, other applications 114, a database 116, and a communication module 118. Transaction processor application 112 and other applications 114 may correspond to executable processes, procedures, and/or applications with associated hardware. In other embodiments, establisher device 110 may include additional or different modules having specialized hardware and/or software as required.

Transaction processor application 112 may correspond to one or more processes to execute software modules and associated devices of establisher device 110 to process electronic transactions over a network with one or more other services and/or users, including an electronic transaction to purchase a digital gift card having a stored value provided by a first account of a first user. In this regard, transaction processor application 112 may correspond to specialized hardware and/or software utilized by a user of establisher device 110 that may be used to access a website or an interface of a merchant or service provider that allows establisher device 110 to request digital gift card generation, enter details for the digital card, provide an account or other payment instrument used to provide the value for the balance of the digital card, and instruct the digital card to be sent to one or more other users. Transaction processor application 112 may utilize one or more user interfaces, such as graphical user interfaces presented using an output display device of establisher device 110, to enable the user associated with establisher device 110 to access the digital gift card establishment process and select and provide payment for the value balance of the digital gift card. In various embodiments, transaction processor application 112 may correspond to a general browser application configured to retrieve, present, and communicate information over the Internet (e.g., utilize resources on the World Wide Web) or a private network. For example, transaction processor application 112 may provide a web browser, which may send and receive information over network 150, including retrieving website information (e.g., a website for transaction processor server 130), presenting the website information to the user, and/or communicating information to the website, including payment information for transaction processed through transaction processor server 130. However, in other embodiments, transaction processor application 112 may include a dedicated application of transaction processor server 130 or other entity (e.g., a merchant), which may be configured to assist in processing transactions electronically, including transactions for digital gift cards. The interface(s) providing by transaction processor application 112 may be utilized to engage in electronic transaction processing, including online or virtual purchases of digital gift cards that may be purchased over a network and electronically communicated to other accounts and/or devices, including claimer device 120.

During digital gift card creation, transaction processor application 112 may be utilized to select payment instrument (s) for use in providing payment for a purchase transaction, transfer, or other financial process. As discussed herein, transaction processor application 112 may utilize user financial information, such as a credit card, bank account, or other financial account, as a payment instrument when providing payment information. Additionally, transaction processor application 112 may utilize a digital wallet stored with an account with a payment provider, such as transaction processor server 130, as the payment instrument, for example, through accessing a digital wallet or account of a user with transaction processor server 130 through entry of authentication credentials and/or by providing a data token that allows for processing using the account. Transaction processor application 112 may utilize a digital token for the payment account, digital wallet, and/or payment instruments by providing the digital token to authenticate the user and/or use the user's payment account, digital wallet, and/or payment instruments, which may be encrypted and/or provided through a secure channel, to a transaction participant to authenticate the an account, digital wallet, and/or payment instruments to transaction processor server 130 and allow for transaction processing and payment using the account, digital wallet, and/or payment instruments. Selection of a payment instrument may occur prior to, at, or after establishment of the digital gift card creation process.

Transaction processor application 112 may then use the account during processing of payment for the digital gift card balance, as discussed herein with respect to transaction processor server 130. However, since the authentication credentials (e.g., username, password, PIN, etc.) and/or token may be stolen, spoofed, or otherwise misappropriated, a fraudulent user may utilize transaction processor application 112 to fraudulently use an account of another user and create a digital gift card. Moreover, during the digital gift card creation, the user (including the fraudulent user during a fraudulent digital gift card creation) of establisher device 110 may request the digital gift card be electronically communicated to another account and/or device, for example, claimer device 120 that may access the digital gift card and attempt to redeem the digital gift card. Transaction processor application 112 may be utilized to view the results of payment, for example, using transaction histories, dispute resolution processes, and other post-transaction process. The results may include fraud assessments and later reversed transactions based on fraud assessments. Transaction processor application 112 may further be used to access and/or navigate to one or more interfaces to provide feedback based on the fraud assessment, which may be utilized by transaction processor server 130 during machine learning of past fraud assessments.

In various embodiments, transaction processor application 112 may be utilized to create an account used to purchase digital gift cards and/or engage in other transaction processing. In this regard, transaction processor application 112 may be used to enter one or more payment instruments or other funding sources for storage in a digital wallet associated with a payment account (e.g., stored and/or serviced by transaction processor server 130), access the digital wallet and/or payment account for use, and engage in transaction processing with another entity. Transaction processor application 112 may provide an interface to permit the user to enter input and other data for payment instruments, for example, through an input device (e.g., touch screen with a graphical user interface, keypad/keyboard, mouse, etc.) and/or through a data capture device (e.g., scanner, camera, other optical device, etc.). Such information may be stored with transaction processor server 130 for use with an online digital wallet and/or account for the user, which may be utilized for transaction processing with another entity, such as a merchant associated with claimer device 120.

In various embodiments, information for the account may also be stored to establisher device 110 for use in an offline environment. The account accessible through transaction processor application 112 may be used to initiate, receive, and/or process/complete transactions using services provided by transaction processor server 130. Once entered, the payment instruments may be communicated to transaction processor server 130 over network 150 by transaction processor application 112 for establishment and/or maintenance/update of the account and/or entry into the digital wallet for the user. The user of establisher device 110 may also enter benefits to transaction processor application 112. The benefits may correspond to one or more of rewards programs, rewards programs membership level, rewards program points, available items in at least one rewards program, cash-back amounts for the at least one rewards program, airline miles, promotional credit, promotional credit rates, promotional discount rate, merchant discounts, merchant discount rates, and merchant coupons. Such information may also be used to provide a value for a balance of a digital gift card. However, in other embodiments, transaction processor application 112 may access and utilize a previously established account, which may include accessing and utilizing an account established by another user, for example, by a fraudulently acting user that purchases a digital gift card as discussed above using an account of another user. Thus, transaction processor application 112 may not be utilized to create the account, and instead may be used during a fraudulent account takeover action of another's account, where the fraudulent action of the fraudulently acting user uses the account of the other user without consent and/or knowledge.

In various embodiments, establisher device 110 includes other applications 114 as may be desired in particular embodiments to provide features to establisher device 110. For example, other applications 114 may include security applications for implementing client-side security features, programmatic client applications for interfacing with appropriate application programming interfaces (APIs) over network 150, or other types of applications. Other applications 114 may also include email, texting, voice and IM applications that allow a user to send and receive emails, calls, texts, and other notifications through network 150. In various embodiments, other applications 114 may include financial applications, such as banking applications. Other applications 114 may also include other location detection applications, which may be used to determine a location for the user, such as a mapping, compass, and/or GPS application, which can include a specialized GPS receiver that obtains location information for establisher device 110 and processes the location information to determine a location of establisher device 110 and the user. Other applications may include social networking applications, media viewing, and/or merchant applications. Other applications 114 may include device interface applications and other display modules that may receive input from the user and/or output information to the user. For example, other applications 114 may contain software programs, executable by a processor, including a graphical user interface (GUI) configured to provide an interface to the user. Other applications 114 may therefore use devices of establisher device 110, such as display devices capable of displaying information to users and other output devices, including speakers.

Establisher device 110 may further include database 116 stored to a transitory and/or non-transitory memory of establisher device 110, which may store various applications and data and be utilized during execution of various modules of establisher device 110. Thus, database 116 may include, for example, identifiers such as operating system registry entries, cookies associated with transaction processor application 112 and/or other applications 114, identifiers associated with hardware of establisher device 110, or other appropriate identifiers, such as identifiers used for payment/user/device authentication or identification, which may be communicated as identifying establisher device 110 to transaction processor server 130. Database 116 may include digital gift card information, as well as information for one or more accounts, which may be provided to transaction processor server 130 during digital gift card establishment and/or after digital gift card establishment for use in determining fraud assessments. Additional device data stored to database 116 may also be provided to transaction processor server 130 for the fraud assessment.

Establisher device 110 includes at least one communication module 118 adapted to communicate with claimer device 120 and/or transaction processor server 130. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 118 may communicate directly with nearby devices using short range communications, such as Bluetooth Low Energy, LTE Direct, WiFi, radio frequency, infrared, Bluetooth, and near field communications.

Claimer device 120 may be implemented as a communication device that may utilize appropriate hardware and software configured for wired and/or wireless communication with establisher device 110 and/or transaction processor server 130. For example, in one embodiment, claimer device 120 may be implemented as a personal computer (PC), telephonic device, a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

Claimer device 120 of FIG. 1 contains an account application 122, other applications 124, a database 126, and a communication module 128. Account application 122 and other applications 124 may correspond to executable processes, procedures, and/or applications with associated hardware. In other embodiments, claimer device 120 may include additional or different modules having specialized hardware and/or software as required.

Account application 122 may correspond to one or more processes to execute software modules and associated devices of claimer device 120 to access a digital gift card, for example, using an account or gift card processing application, and redeem/use a balance of the digital gift card having a value that may be utilized. In this regard, account application 122 may correspond to specialized hardware and/or software that may receive a digital gift card having card data, which may include a navigation tool, icon, or link that may be used through a navigation event that navigates account application to a digital gift card redemption/use process of transaction processor server 130 and allow a user, such as a second user of claimer device 120, to attempt to redeem and/or use the balance of the digital gift card based on a fraud assessment. The process may correspond to a web application hosted by transaction processor server 130, where the web application may be provided through a website having one or more webpages that include data entry fields that allow access and/or redemption of a balance for a gift card (e.g., by allowing the balance to be activated, In other embodiments, the digital gift card may additionally or instead have card authentication data, where the card authentication data may include information necessary to be input to one or more interface fields for the redemption/use of the digital gift card, for example, through a similar redemption/use process. As discussed herein, a first user associated with establisher device 110 may generate the digital gift card, which may be communicated to claimer device 120, for example, directly by establisher device 110 and/or by transaction processor server 130. Account application 122 may then store the data for the digital gift card, which may be accessed by claimer device 120 when the second user wishes to redeem/use the digital gift card. Account application 122 may provide account and/or device details for use in the fraud assessment of claimer device 120 and/or the account used to redeem/use the digital gift card. Additionally, account application 122 may be used to provide an output and/or action in response to a fraud assessment, such as one or more results and/or navigations based on the fraud assessment.

Account application 122 may also provide account and/or transaction processing services through one or more processes that provide an interface to permit the second user to enter input and other data for payment instruments, for example, through an input device (e.g., touch screen with a graphical user interface, keypad/keyboard, mouse, etc.) and/or through a data capture device (e.g., scanner, camera, other optical device, etc.). Such information may be stored with transaction processor server 130 for use with an online digital wallet stored to an account for the second user with transaction processor server 130, which may be utilized for transaction processing with another entity, such as the merchant. In various embodiments, information for the account may also be stored to claimer device 120 for use in an offline environment. The account accessible through account application 122 may be used to initiate, receive, and/or process/complete transactions using services provided by transaction processor server 130. Once entered, the payment instruments may be communicated to transaction processor server 130 over network 150 by account application 122 for establishment and/or maintenance/update of the account and/or entry into the digital wallet for the second user. The second user of claimer device 120 may also enter discounts and/or benefits to account application 122 for storage to the digital wallet and use during transaction processing. In other embodiments, account application 122 may provide other types of account services, including email services, messaging services, social networking or media sharing services, microblogging services, or other online account type services where the account may be used to receive a digital gift card, as well as redeem/use the digital gift card. Thus, other types of accounts and their respective data may also be processed during a fraud assessment by transaction processor server 130.

Account application 122 may utilize one or more user interfaces, such as graphical user interfaces presented using an output display device of claimer device 120, to enable the second user associated with claimer device 120 to perform transaction processing and/or view the results of a processed transaction, as discussed herein. In various embodiments, account application 122 may correspond to a general browser application configured to retrieve, present, and communicate information over the Internet (e.g., utilize resources on the World Wide Web) or a private network. For example, account application 122 may provide a web browser, which may send and receive information over network 150, including retrieving website information (e.g., a website for transaction processor server 130), presenting the website information to the user, and/or communicating information to the website. However, in other embodiments, account application 122 may include a dedicated application of transaction processor server 130 or other entity (e.g., a merchant), which may be configured to assist in processing transactions. The interface(s) providing by account application 122 may be utilized to populate the responsive action to a request to access a digital gift card, such as a message, application navigation, and/or authentication request. Account application 124 may also be used to provide feedback back on a fraud assessment.

In various embodiments, claimer device 120 includes other applications 124 as may be desired in particular embodiments to provide features to claimer device 120. For example, other applications 124 may include security applications for implementing client-side security features, programmatic client applications for interfacing with appropriate application programming interfaces (APIs) over network 150, or other types of applications. Other applications 124 may also include email, texting, voice and IM applications that allow a user to send and receive emails, calls, texts, and other notifications through network 150. In various embodiments, other applications 124 may include financial applications, such as banking applications. Other applications 124 may also include other location detection applications, which may be used to determine a location for the user, such as a mapping, compass, and/or GPS application, which can include a specialized GPS receiver that obtains location information for claimer device 120 and processes the location information to determine a location of claimer device 120 and the user. Other applications may include social networking applications, media viewing, and/or merchant applications. Other applications 124 may include device interface applications and other display modules that may receive input from the user and/or output information to the user. For example, other applications 124 may contain software programs, executable by a processor, including a graphical user interface (GUI) configured to provide an interface to the user. Other applications 124 may therefore use devices of claimer device 120, such as display devices capable of displaying information to users and other output devices, including speakers.

Claimer device 120 may further include database 126 stored to a transitory and/or non-transitory memory of claimer device 120, which may store various applications and data and be utilized during execution of various modules of claimer device 120. Thus, database 126 may include, for example, identifiers such as operating system registry entries, cookies associated with account application 122 and/or other applications 124, identifiers associated with hardware of claimer device 120, or other appropriate identifiers, such as identifiers used for payment/user/device authentication or identification. In various embodiments, database 126 may include digital gift card information, as well as device and/or account information for claimer device 120 and/or an account used by claimer device 120, which may be provided to transaction processor server 130 for a fraud assessment.

Claimer device 120 includes at least one communication module 128 adapted to communicate with establisher device 110 and/or transaction processor server 130. In various embodiments, communication module 128 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 128 may communicate directly with nearby devices (e.g., claimer device 120) using short range communications, such as Bluetooth Low Energy, LTE Direct, WiFi, radio frequency, infrared, Bluetooth, and near field communications.

Transaction processor server 130 may be maintained, for example, by an online service provider, which may provide transaction processing services on behalf of users and/or merchants including generation, use, and/or fraud/risk analysis services for digital gift card processing. In this regard, transaction processor server 130 includes one or more processing applications which may be configured to interact with establisher device 110, claimer device 120, and/or another device/server to facilitate transaction processing. In one example, transaction processor server 130 may be provided by PAYPAL®, Inc. of San Jose, CA, USA. However, in other embodiments, transaction processor server 130 may be maintained by or include another type of service provider, which may provide connection services to a plurality of users.

Transaction processor server 130 of FIG. 1 includes a gift card fraud application 140, a transaction processing application 132, other applications 134, a database 136, and a network interface component 138. Gift card fraud application 140, transaction processing application 132, and other applications 134 may correspond to executable processes, procedures, and/or applications with associated hardware. In other embodiments, transaction processor server 130 may include additional or different modules having specialized hardware and/or software as required.

Gift card fraud application 140 may correspond to one or more processes to execute software modules and associated specialized hardware of transaction processor server 130 to analyze transaction and account information for a digital gift card at a time of redemption and/or use of the digital gift card, for example, when a user utilizing claimer device 120 requests access to the digital gift card, to determine whether one or more of the entities involved in establishment and/or use of the digital gift card are acting fraudulently by attempting to utilize another user's account to receive a value that the fraudulently acting user(s) is not entitled to receive. In this regard, gift card fraud application 140 may correspond to specialized hardware and/or software to receive transaction information and/or access account information for determination of whether entities in a transaction for a digital gift card are acting fraudulently by receiving a request to access the digital gift card and redeem/utilize the digital gift card from claimer device 120. Gift card fraud application 140 may execute a risk or fraud assessment and detection engine to determine whether the digital gift card was generated fraudulently and/or is attempting to be redeemed fraudulently by one or more of establisher device 110 and/or claimer device 120. The engine may correspond to a hardware and/or software engine of the service provider that may be executed in response to detecting the navigation event, link/icon/option selection, digital card data input, or other request to execute a process of transaction processing application 132 to access the digital gift card and use the digital gift card's balance.

Gift card fraud application 140 may process device data for claimer device 120, such as device parameters, identifiers, and/or usage to determine a fraud assessment. Gift card fraud application 140 may also utilize account information to the receiving account associated with claimer device 120 that is receiving and/or using the digital gift card in the request. The data may correspond to real-time data that is updated and/or retrieved in real-time based on the request to access the digital gift card. Moreover, gift card fraud application 140 may utilize one or more rules, weights, or processing algorithms to determine the risk score or fraud assessment for claimer device 120 to be provided access to the digital gift card for use. The rules or weights may correspond to an overall value of each data parameter for the account/device data in an overall fraud assessment and/or risk score. The fraud assessment and/or risk score may be required to meet or exceed a threshold score, number, or value to allow access to the digital gift card or deny access to the digital gift card, where the threshold may be set by an administrator or automatically set by gift card fraud application 140 based on past fraudulent gift card transactions and fraud assessments.

Gift card fraud application 140 may also utilize account data for an account of establisher device 110 used to create the digital gift card to determine the fraud assessment, as well as device data for establisher device 110. The account/device data associated with establisher device 110 may similarly be retrieved in real-time at the time of the request to access the digital gift card, and may be used to determine the fraud assessment. Transaction data for the transaction to create the digital gift card may also be used, as well as other online data including available customer information, user restrictions, and bad/negative transaction flags associated with establisher device 110 and/or claimer device 120.

Gift card fraud application 140 may then execute an action in response to the fraud assessment. The action may correspond to a processing and/or navigation action that may allow or deny access to the digital gift card's balance for use based on the fraud assessment. If the fraud assessment indicates potential fraud, then claimer device 120 may be unable to access the digital gift card and redeem/use the balance. Additionally, gift card fraud application 140 may automatically reverse the transaction for the digital gift card and provide the balance back to the purchasing account, or may flag the digital gift card for administrator reversal. If the fraud assessment does not indicate fraud, then gift card fraud application 140 may allow transaction processing application 132 to process the digital gift card for claimer device 120 and provide the balance for use. Gift card fraud application 140 may also execute a machine learning process to update gift card fraud application 140, which may be based on the fraud assessment and other fraud assessments, as well as feedback for the fraud assessment, such as a correctness or other indicator of the fraud assessment. The machine learning process may update parameters and data for the fraud assessment engine of gift card fraud application 140, change weights and/or data considerations by the engine, or otherwise update the engine based on the correctness of the fraud assessment. The aforementioned data factors may be updated based on the feedback, as well as changing real-time data and/or calculations for fraud assessments. Gift card fraud application 140 may receive feedback of false negative, true negative, false positive, and true positive outcomes of the fraud assessment, and may revise the parameters, weights, and/or fraud assessment calculation based on such data.

Transaction processing application 132 may correspond to one or more processes to execute software modules and associated specialized hardware of transaction processor server 130 to provide payment and transaction processing services to merchants and users, for example though an account and/or payment instruments of the user to an account of the merchant, where the service may include services associated with establishment, transmission, use and/or fraud assessment of digital gift cards. In this regard, transaction processing application 132 may correspond to specialized hardware and/or software to provide transaction processing and payment services through accounts, including digital wallets storing payment instruments. The services may allow for a payment through a payment instrument, including a credit/debit card, banking account, payment account with transaction processor server 130, and/or other funding instrument. The payment may be used to provide a value for a digital gift card. In order to establish an account to send and receive payments, transaction processing application 132 may receive information requesting establishment of the account. The information may include user personal, business, and/or financial information. Additionally the information may include a login, account name, password, PIN, or other account creation information. The entity establishing the account may provide a name, address, social security number, or other personal or business information necessary to establish the account and/or effectuate payments through the account. Transaction processing application 132 may further allow the entity to service and maintain the payment account, for example, by adding and removing funding instruments.

Transaction processing application 132 may be used to provide a payment for a digital gift card at an initial establishment phase of the digital gift card, or may provide the payment for the value balance of the digital gift card at a time of redemption/use of the digital gift card. Transaction processing application 132 may process the payment to provide the value for the digital gift card. Based on a fraud assessment, transaction processing application 132 may provide or deny access the balance of the digital gift card. Transaction processing application 132 may also be used to reverse a fraudulently purchased digital gift card, as well as process an electronic transaction using a digital gift card that was not fraudulently purchased. Transaction processing application 132 may debit an account of the user and provide the payment to an account of the merchant. Transaction processing application 132 may also be used to provide transaction histories for processed transactions.

In various embodiments, transaction processor server 130 includes other applications 134 as may be desired in particular embodiments to provide features to transaction processor server 130. For example, other applications 134 may include security applications for implementing server-side security features, programmatic client applications for interfacing with appropriate application programming interfaces (APIs) over network 150, or other types of applications. Other applications 134 may contain software programs, executable by a processor, including a graphical user interface (GUI), configured to provide an interface to the user when accessing transaction processor server 130, where the user or other users may interact with the GUI to more easily view and communicate information. In various embodiments, other applications 134 may include connection and/or communication applications, which may be utilized to communicate information to over network 150.

Additionally, transaction processor server 130 includes database 136. As previously discussed, the user and/or the merchant may establish one or more digital wallets and/or accounts with transaction processor server 130. Digital wallets and/or accounts in database 136 may include user information, such as name, address, birthdate, payment instruments/funding sources, additional user financial information, user preferences, and/or other desired user data. Users may link to their respective digital wallets and/or payment accounts through an account, user, merchant, and/or device identifier. Thus, when an identifier is transmitted to transaction processor server 130, e.g., from establisher device 110, one or more digital wallets and/or payment accounts belonging to the users may be found. Database 136 may also store digital gift card data, as well as data for one or more devices and/or account involved in the establishment and use of the digital gift card. Additionally, fraud assessments, tools used to determine fraud assessments, and feedback from fraud assessments may be stored to database 136.

In various embodiments, transaction processor server 130 includes at least one network interface component 138 adapted to communicate establisher device 110 and/or claimer device 120 over network 150. In various embodiments, network interface component 138 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 150 may be implemented as a single network or a combination of multiple networks. For example, in various embodiments, network 150 may include the Internet or one or more intranets, landline networks, wireless networks, and/or other appropriate types of networks. Thus, network 150 may correspond to small scale communication networks, such as a private or local area network, or a larger scale network, such as a wide area network or the Internet, accessible by the various components of system 100.

Figure 2:
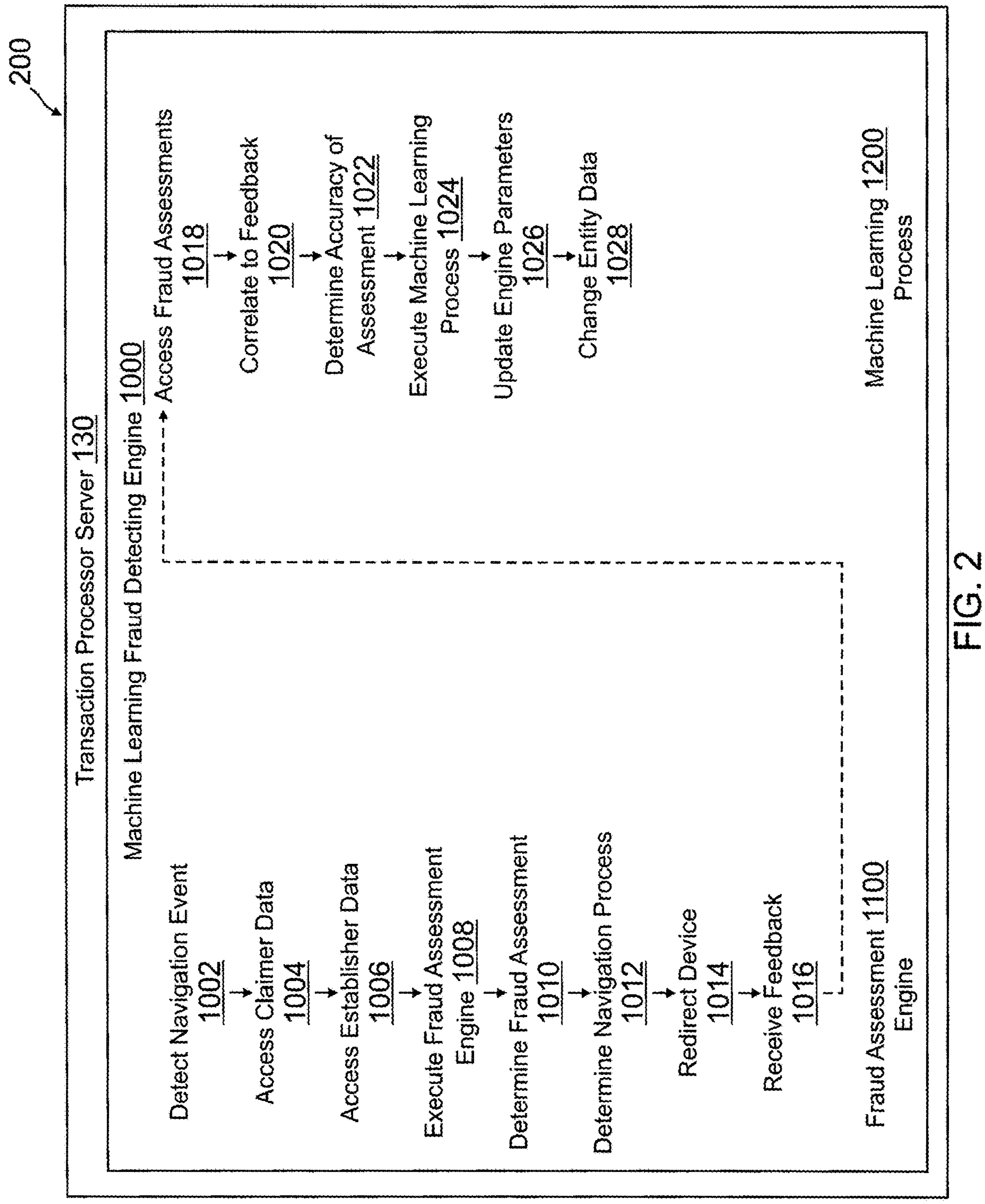
FIG. 2 is an exemplary block diagram of a machine learning engine that provides fraud assessment when a device attempts redemption of a gift card value through a navigation event, according to an embodiment.

FIG. 2 is an exemplary block diagram of a machine learning engine that provides fraud assessment when a device attempts redemption of a gift card value through a navigation event, according to an embodiment. Environment 200 includes a transaction processor server 130 corresponding generally to the described features, processes, and components of transaction processor server 130 in system 100 of FIG. 1. In this regard, a user requesting access and/or use of a digital gift card may utilize transaction processor server 130, which may execute a machine learning fraud detection engine 1000 to assess potential fraud by the user and grant or deny access to the balance of the digital gift card.

In this regard, a machine learning fraud detection engine 1000 includes executable process steps of a fraud assessment engine 1100 and a machine learning process 120. Fraud assessment engine 1100 may first detect a navigation event, at step 1002, which may correspond to a request to access or use a balance of the digital gift card. Step 1002 may be performed when a user clicks on or otherwise selects a navigation link and/or enters gift card details to an interface. In response to step 1002, fraud assessment engine 1100 may access claimer data, at step 1004, which may include device and/or account data for the device that executes the navigation event. Additionally, fraud assessment engine 1100 may access establisher data, at step 1006, which may include the account and/or device data for the establisher or generator of the digital gift card. The data may be updated and accessed in real-time at the time of the navigation event so that the data is current at the time of the request to access and/or use the digital gift card.

At step 1008, fraud assessment engine 1100 is executed and uses the data to determine a fraud assessment output at step 1010. The fraud assessment may be based on factors, parameters, rules, and/or weights to various data input to fraud assessment engine 1100, and may correspond to a determination of whether the generation and/or use of the digital gift card is fraudulent. Based on the fraud assessment, at step 1012, a navigation process is determined. The navigation process may direct the user's device to a redemption process associated with use of the digital gift card's balance if the fraud assessment does not indicate potential fraud, or may redirect the user to one or more interfaces associated with potential fraud, such as authentication interfaces and/or alert interfaces, where the fraud assessment indicates fraud. The navigation process may be used to redirect the user's device, at step 1014. Additionally, based on the navigation process and/or the use of the digital gift card, feedback may be received from one or more users, including the establishing user, the claiming user, and/or an administrator of fraud assessment engine 1100.

Machine learning process 1200 may then be executed to update and perform machine learning based on fraud assessments and related data for a digital gift card access request and/or use. For example, at a step 1018, fraud assessments may be accessed, which may have been determined by fraud assessment engine 1100, for example, at step 1010. Step 1018 may include multiple fraud assessments, which, at step 1020, may be correlated to feedback received at step 1016. Based on the feedback for fraud assessments, machine learning process 1200 may determine an accuracy of each assessment, at step 1022. The accuracy of the fraud assessments, such as whether they amount to a false negative, true negative, false positive, or true positive, and the overall score and data used for the fraud assessments, may be used with executed machine learning process 1200, at step 1024. Machine learning process 1200 may then update the engine parameters of fraud assessment engine 1100, at step 1026, as well as change entity data for the establishing user and/or claiming user of the digital gift card, at step 1028.

Figure 3:
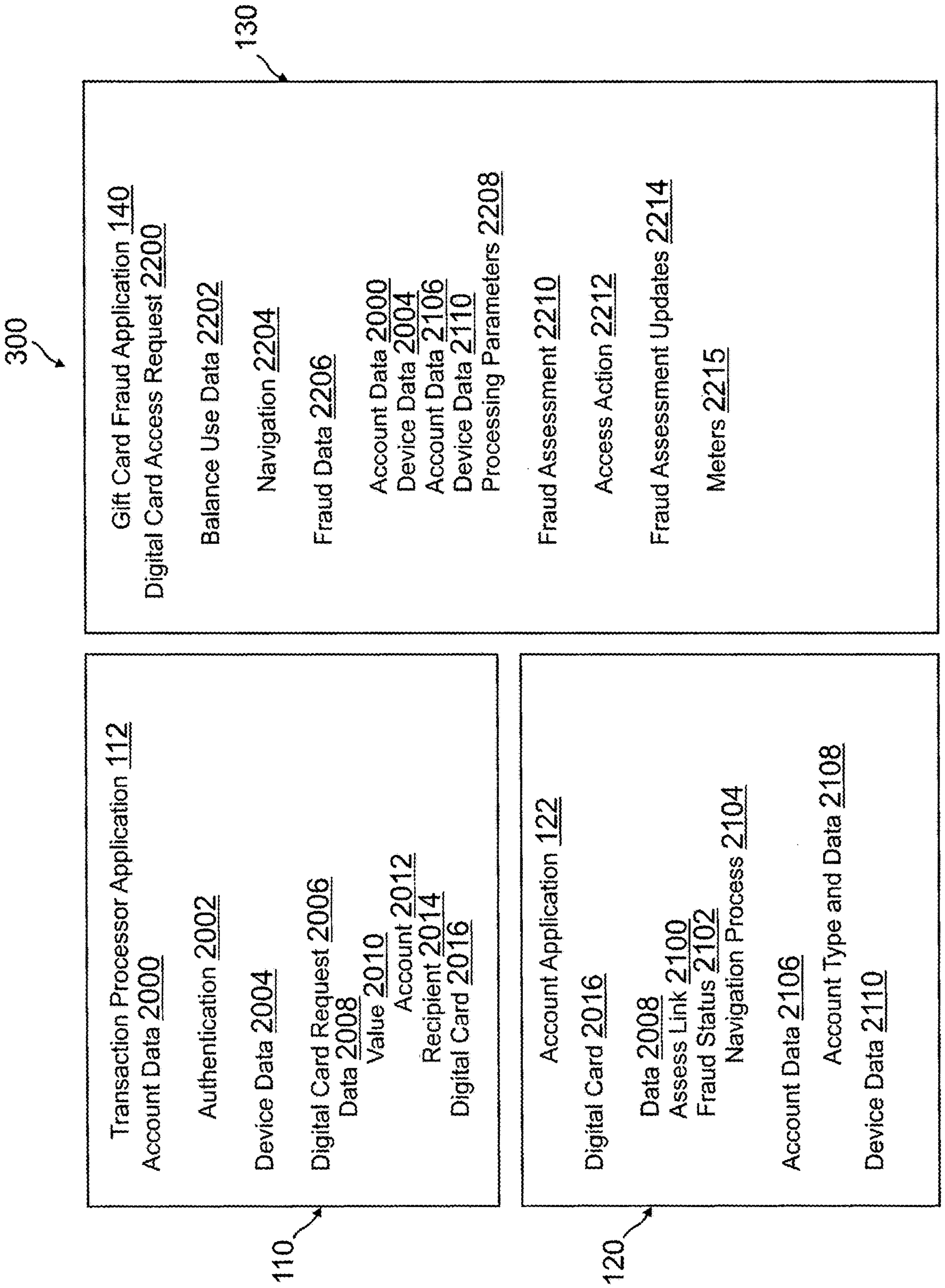
FIG. 3 is an exemplary system environment where a communication device and a merchant device may interact during link selection for redemption of a gift card and a service provider may determine a fraud assessment of the communication device when redeeming the gift card, according to an embodiment.

FIG. 3 is an exemplary system environment where a communication device and a merchant device may interact during link selection for redemption of a gift card and a service provider may determine a fraud assessment of the communication device when redeeming the gift card, according to an embodiment. FIG. 3 includes establisher device 110, claimer device 120, and transaction processor server 130 discussed in reference to system 100 of FIG. 1.

In environment 300, establisher device 110 executes transaction processor application 112 corresponding generally to the processes and features discussed in reference to system 100 of FIG. 1. In this regard, establisher device 110 may utilize transaction processor application 112 to generate and/or establish a digital gift card, which may be conveyed to an account utilized by claimer device 120. For example, transaction processor application 112 includes account data 2000 having an authentication 2002 for an account associated with account data 2000. Transaction processor application 112 further includes device data 2004 that may be provided to transaction processor server 130 with account data 2000 during a digital card request 2006, as well as at a later time. Digital card request 2006 may also include data 2008 for digital card request 2006. Data 2008 may further include a value 2010 provided with an account 2012, as well as a recipient 2014 for a digital card 2016.

In environment 300, claimer device 120 executes account application 122 corresponding generally to the processes and features discussed in reference to system 100 of FIG. 1. In this regard, claimer device 120 may utilize account application 122 to request access to a digital gift card, which may include redemption and/or use of the digital gift card. For example, account application 122 may utilize digital card 2016 established from data provided by establisher device 110, which may include data 2008. Digital card 2016 may further be provided with an access link 2100 that can be selected to navigate to a process to redeem and/or use a balance of digital card 2016. After selection of access link 2100, account application 122 may receive a fraud status 2102 for digital card 2016, which may come with a navigation process 2105. Account application 122 may further include account data 2106 having an account type and data 2108 and device data 2110, which may be used to determine fraud status 2102 by transaction processor server 130.

In environment 300, transaction processor server 130 executes gift card fraud application 140 corresponding generally to the processes and features discussed in reference to system 100 of FIG. 1. In this regard, transaction processor server 130 may utilize gift card fraud application 140 to determine fraud assessments for requests to use a digital gift card, which may include digital card access request 2200. For example, digital card access request 2200 may include balance use data 2202 having a navigation 2204. Based on navigation 2204, fraud data 2206 from establisher device 110 and claimer device 120 may be received. Fraud data 2206 may include the aforementioned account data 2000, device data 2004, account data 2106, and device data 2110, as well as processing parameters 2208 used with the retrieved data. Based on fraud data 2206, a fraud assessment 2210 may be determined, which may include an access action 2212 for digital card 2016. Additionally, gift card fraud application 140 may determine fraud assessment updates 2214 from metrics 2215 based on fraud assessment 2210 and other fraud assessments and feedback.

Figure 4:
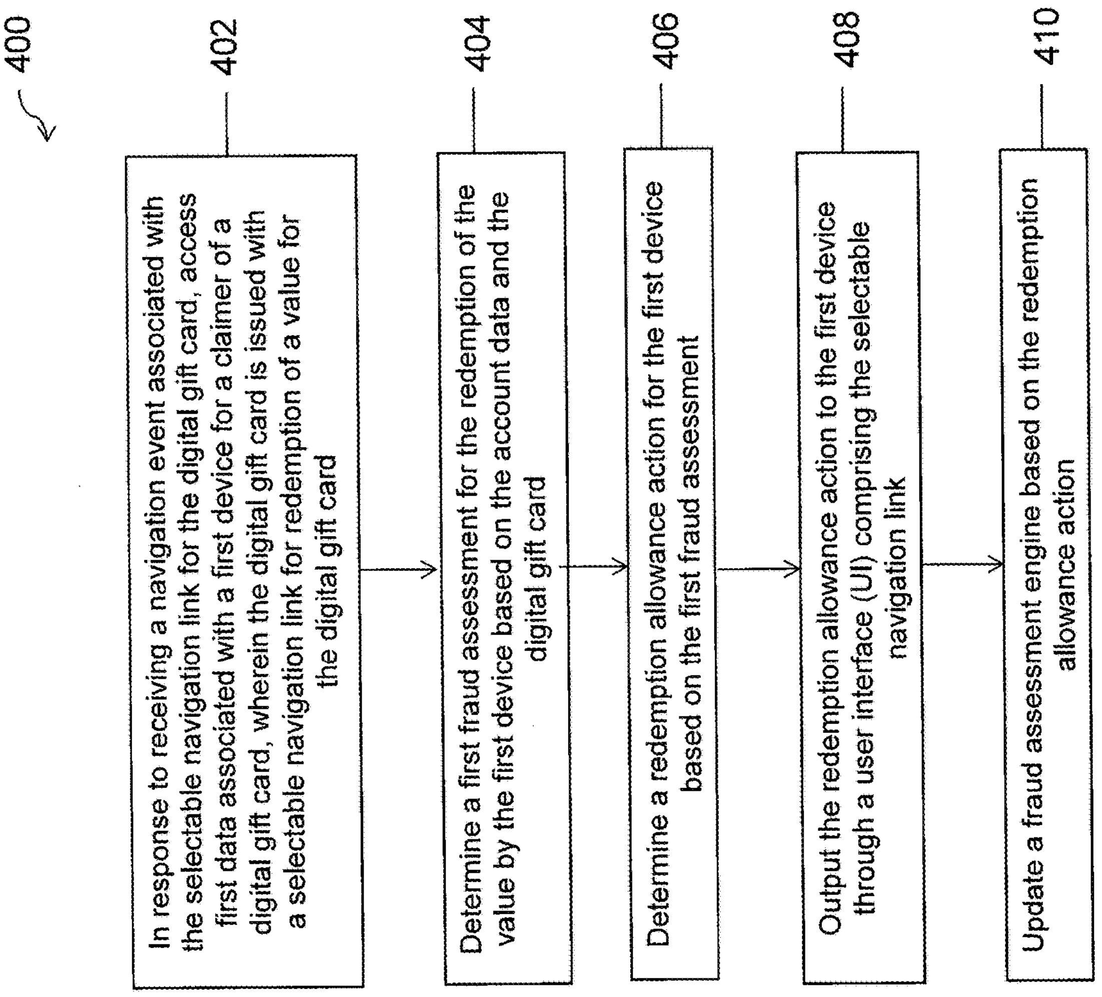
FIG. 4 is a flowchart of an exemplary process for a machine learning engine for fraud detection following link selection, according to an embodiment.

FIG. 4 is a flowchart of an exemplary process for a machine learning engine for fraud detection following link selection, according to an embodiment. Note that one or more steps, processes, and methods described herein may be omitted, performed in a different sequence, or combined as desired or appropriate.

At step 402, in response to receiving a navigation event associated with the selectable navigation link for the digital gift card, first data associated with a first device for a claimer of a digital gift card is accessed, wherein the digital gift card is issued with a selectable navigation link for redemption of a value for the digital gift card. The navigation event may be received through input to the UI as a selection of the selectable navigation link within a field of the UI, wherein the selection of the selectable navigation link requests execution of a process for the redemption of the value. The UI may be output through one of a webpage for a merchant providing the value for the digital gift card or dedicated application for the merchant. The first data may comprise browser data for the first device including a session IP address, browser language, browser type, browser version, browser input, or a location, as well as customer information for the claimer and user restrictions on the claimer.

At step 404, a first fraud assessment is determined for the redemption of the value by the first device based on the account data and the digital gift card. The account may correspond to an email address, and the account information may comprise at least one of a number of transactions made using the email address, a number of unique claimer IP addresses for the email address, a number of gift cards received by the email address, a number of days between establishment of the pre-purchased value and the selection of the link, a usage rate of the email address or an IP address for the email address, a geo-location of the email address, an authentication risk score, a name associated with the email address, a country of origin of the IP address for the email address, or a redirection during authentication flow used by the email address. The first device may use an application to request use of the digital gift card, which may comprise a web browser or a dedicated application that navigates to the interface to request access to the digital gift card and initiate the fraud assessment determination.

Prior to receiving the navigation event, the digital gift card may be generated using an account of a user, wherein the account of the user is used to provide the value for the digital gift card, and in response to receiving the navigation event, account data for the account may be accessed, wherein the first fraud assessment is further determined using account data for the account. Account data may comprise a negative tag for a transaction processed using the account, wherein the negative tag comprises one of a bad or fraudulent transaction tag or a reversed transaction tag transactions for the transaction resulting from an account takeover reversal of the transaction or administrator fraud reversal of the transaction. The account data may also further comprise login browser data at a time of request for the generating the digital gift card by using the account, wherein the login browser data comprises at least one of a session IP address, browser language, browser type, browser version, browser input, or a location. In various embodiments, account information for an account establishing the digital gift card and/or a pre-purchased balance for the digital gift card may be accessed or determined in real time. Such information may be used for the fraud assessment.

A redemption action for the first device is determined based on the first fraud assessment, at step 406. The redemption action may provide or restrict access to the value of the digital gift card based on the first fraud assessment. The redemption action is output to the first device through a user interface (UI) comprising the selectable navigation link, at step 408. At step 410, a fraud assessment engine is updated based on the redemption action. Updating the fraud assessment engine may comprise executing a machine learning process of the fraud assessment engine and revising parameters of the fraud assessment engine for determining a plurality of fraud assessments including the first fraud assessment using the machine learning process and past fraudulent transaction indications. The past fraudulent transaction indications may comprise a determination of a potentially fraudulent redemption of a previous digital gift card, wherein the parameters of the fraud assessment engine are refined/revised based on a correctness of the determination from user input associated with the previous digital gift card. In certain embodiments, such updating may include receiving feedback for the redemption action and/or a login action associated with the navigation event to use the digital gift card, determining whether the action was correct based on the feedback, and automatically updating, without user input, machine learning factors for the fraud assessment engine based on the determining whether the action is correct.

The machine learning and/or artificial intelligence portion of the fraud assessment engine may be trained using one or more machine learning algorithms, such as gradient boosting. Gradient boosting provides a predicative model utilized for machine learning through multiple machine learning algorithms, which may include decision trees. Decision tree learning may create a module to predict an output value or decision based on utilizing discreet input variable to proceed through nodes that have possible output values. This allows a machine to determine an output value for a target set of input variables by proceeding through multiple different classifications for each input feature, where the input feature corresponds to an input variable allowing for two or more output values. The output values may further correspond to another input feature, where a separate input variable assigned in the target data set may determine the resulting output value. Gradient boosting may apply multiple decision trees to perform more detailed predictions by limiting the scope and depth of the individual decision trees and combining the decision trees into machine learning algorithm. This ensemble of decision trees may be built into a single learning algorithm to allow for individual difficult classifications and/or misclassifications by an initial (or subsequent) decision tree to be remedied by additional decision trees. Thus, the gradient boosting algorithm may utilize multiple combined decision trees to remedy the deficiencies of an initial tree.

Machine learning engine and factors contributing to a gradient boosting tree algorithm may be generated and revised using a software library that provides for implementation of software processes in a fraud assessment and detection engine and platform, such as one provided by a transaction processor system. One such library may be provided by XGBoost, which may provide a software library and/or framework to implement a gradient boosting machine learning engine within the fraud assessment engine. The transaction processor may implement a gradient boosting algorithm, and may initially label fraud transaction data for digital gift card creation and/or redemption (e.g., fraudulent digital gift cards that resulted in loss). The machine learning engine may then extract features for the fraud transaction data, including the aforementioned features related to the account of the user generating the digital gift card, the recipient of the digital gift card, and/or the data associated with the creation of the digital gift card. Unlabeled data, such as the transaction data that includes mainly legitimate transactions, may also contain fraudulent transactions that may have been mislabeled or undetected. As such, a semi-supervised framework may be established with an administrator, where positive and unlabeled learning is applied to provide semi-supervised learning of an initial training data set. Oversampling of the data may be performed where there is more valid or legitimate data (e.g., more validly generated and redeemed digital gift cards) than there is illegitimate or fraudulent data. For example, a service provider, such as a transaction processor system, may receive significantly more valid transaction data than fraudulent transaction data, and so may utilize oversampling due to the imbalanced nature of the training data.

Once the training data is processed, initial decision trees having input features that have output values depending on input variables may be determined. The decision trees may make up the gradient boosting algorithm used to process input transaction data for a digital gift card creation and/or redemption and determine whether there is potential fraud or whether the gift card is valid. These features may be extracted from the training data, and may correspond to the digital gift card creator's account/device, the transaction data for the digital gift card, the redemption data for the digital gift card, and/or the recipient's account/device features, parameters, or other characteristic data. Moreover, XGBoost may allow for a machine learning engine, such as a portion of the fraud assessment engine, to refine decision-making based on further labeled and/or unlabeled data. For example, further sample inputs as training data may be based on resulting fraudulent decisions made by the fraud assessment engine, as well as feedback data that indicates the validity or correctness of the decision. One or more new factors may be determined from fraudulent and valid decisions, including additional account, device, or transaction factors or parameters that either indicate fraud or indicate a valid transaction based on the fraud assessment and the feedback data, such as a new device or account parameter that indicates fraud across a sampling of one or more fraudulent transactions. The fraud assessment factors may be utilized to update, prune, add, or delete one or more decision trees from the gradient boosting algorithm, or may adjust particular nodes, input features, and/or output values. For example, a fraud factor indicating that an IP address change between successive logins within a 30 second interval indicates fraud may be used to generate a new node or decision tree, which may further refine the machine learning process.

Thus, a machine learning process of the fraud assessment or machine learning engine may be executed to update the machine learning engine based on the accuracy or correctness of the fraud risk or assessment, which can be done for or after each assessment or periodically, such as for or after every five assessments or for or after every day. Such a process may use reversed transactions or flagged transactions based on an account takeover action or administrator fraud reversal action to update the engine, where the account takeover action or the administrator fraud reversal action is based on feedback from one of a user of an account associated with the account takeover action or the administrator fraud reversal action or an administer of the engine. As such, fraudulent use of digital or electronic gift or funding cards can be reduced, as risk assessment is also done at the time the card is attempted to be used, using machine learning that updates the process for assessment based on previous correct or incorrect assessments.

Figure 5:
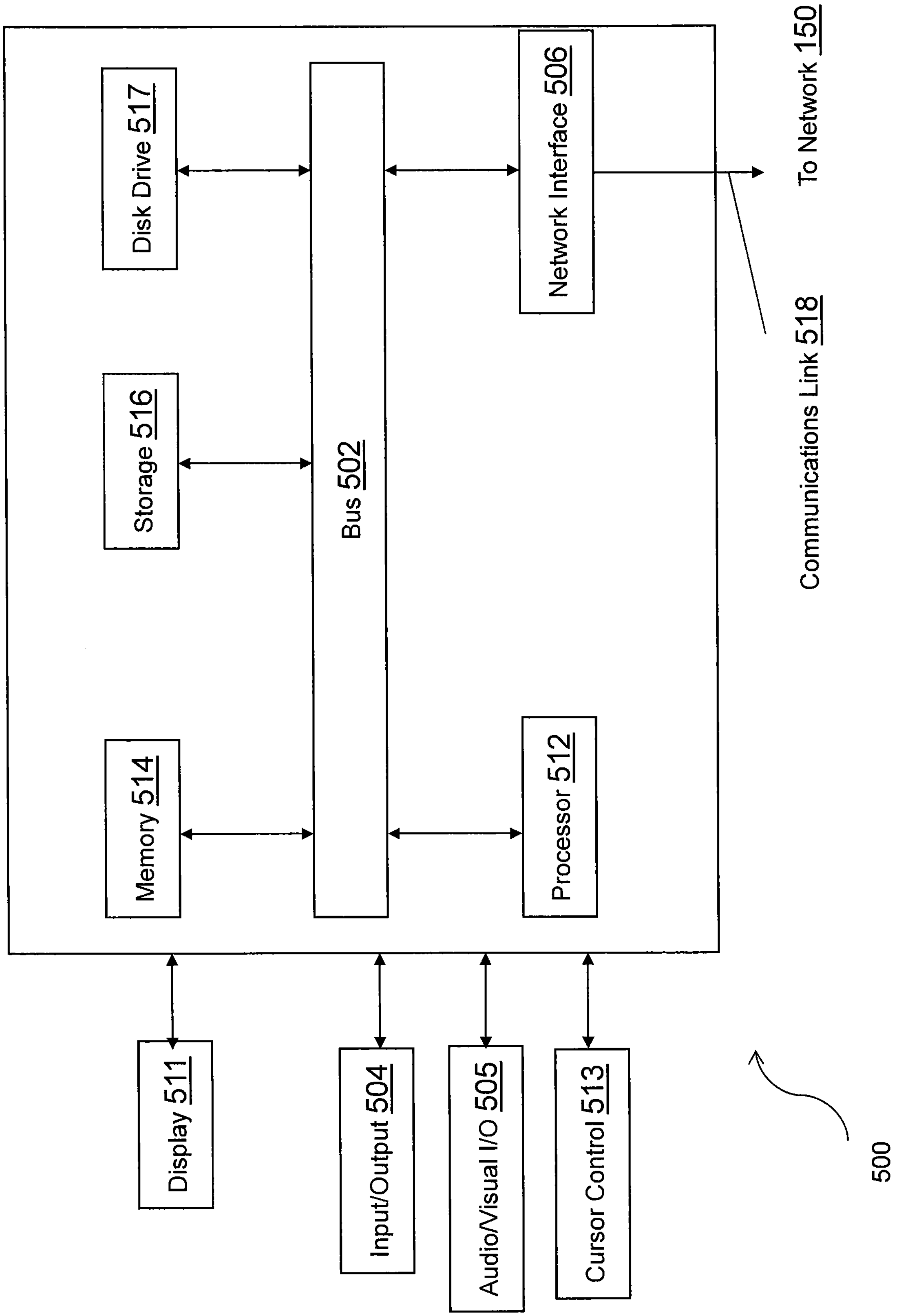
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 150. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:

a processor, and a non-transitory computer-readable medium having stored thereon instructions that, when executed by the processor, cause the processor to perform operations comprising:

receiving, from a first user device of a first user via an electronically presented user interface (UI) element in a first UI presented by the system, a request to claim a stored value digital resource using a unique digital identifier, wherein the request is received with a first device identifier of the first user device based on a navigation event associated with the electronically presented UI element, wherein the electronically presented UI element is associated with a navigation link for a redemption of the stored value digital resource, and wherein the navigation event comprises a selection of the navigation link via the electronically presented UI element;

determining online data associated with at least one of the first device identifier or a first account claiming the stored value digital resource based on the first device identifier, wherein the online data is associated with whether the at least one of the first device identifier or the first account has an indication for fraud;

querying, using the unique digital identifier, a database for account information corresponding to a second account of a second user that established the stored valued digital resource, wherein the account information comprises first information indicating a time of a creation of the stored value digital resource using the second account, and wherein the account information further comprises second information indicating whether the second account has a reversed transaction after the time of the creation of the stored value digital resource;

accessing, in real-time, the online data and the account information, wherein the online data and the account information are current at the time of the request;

executing a machine learning engine based on data for a plurality of classification features extracted from at least a portion of the online data and the account information corresponding to the second account, wherein the executing the machine learning engine is further based on factors and weights applied to the online data and the account information;

determining, classifying, based on one or more outputs from executing the machine learning engine and a fraud threshold associated with the redemption, Q fraud assessment output, wherein the fraud assessment output corresponds to whether the request is a fraudulent request and whether the creation was a fraudulent creation; and based on the fraud assessment output classifying:

allowing the first account to claim the stored value digital resource by transmitting data to the first user device that enables the first user device to claim the stored value digital resource through a second UI presented by the system, or disallowing the first account from claiming the stored value digital resource by restricting an access to the stored value digital resource through a third UI presented by the system.

2. The system of claim 1, wherein the operations further comprise:

querying, using the first device identifier, the database for account information corresponding to the first account claiming the stored value digital resource, wherein the data for the plurality of classification features is further extracted from at least a portion of the account information corresponding to the first account.

3. The system of claim 2, wherein the account information of at least one of the first account or the second account includes at least one of one or more past IP addresses used by the first account or the second account, one or more gift cards associated with the first account or the second account, or one or more geo-locations associated with the first account or the second account.

4. The system of claim 1, wherein the stored value digital resource is associated with a gift card having a card recipient, and wherein the plurality of classification features include at least one feature associated with whether the card recipient matches an account identifier associated with the account information corresponding to the second account.

5. The system of claim 1, wherein the online data comprises at least one of a session IP address associated with a current session for the first user device with the first UI, a browser type and a browser version of a web browser used for the current session, or a browser input to the web browser.

6. The system of claim 1, wherein the operations further comprise:

executing an action to move the stored value digital resource to an account or secure the unique digital identifier from a further use by the first user device or the first account based on the disallowing.

7. The system of claim 1, wherein the machine learning engine comprises a plurality of decision trees, and wherein the plurality of decision trees are trained using training data associated with at least one of prior claims to previous stored value digital resources or prior uses of the previous stored value digital resources during transaction processing.

8. A method comprising:

receiving, by a computer system, a unique digital identifier for a stored value digital resource with a request to use the stored value digital resources by a first user via first user interface (UI) provided by the computer system that enables using at least the stored value digital resource, wherein the first UI is presented based on a navigation event via a link selection from the first UI;

determining, by the computer system, whether the first user has an indication of fraud;

determining, by the computer system, a time of a creation of the stored value digital resource by a second user using a funding instrument and whether the funding instrument is associated with a reversed transaction after the time of the creation of the stored value digital resource;

accessing, by the computer system in real-time, data associated with whether the first user has the indication of fraud and data associated with the funding instrument, wherein the data is current at the time of the request;

executing, by the computer system, a machine learning engine based on a plurality of classification features associated with whether the first user has an indication of fraud or whether the funding instrument is associated with a reversed transaction, wherein the executing the machine learning engine is further based on factors and weights applied to the data;

determining, by the computer system, based on one or more outputs from executing the machine learning engine and a fraud threshold associated with the request, a fraud assessment output, wherein the fraud assessment output corresponds to whether the stored value digital resource was fraudulently created or the first user is acting fraudulently by claiming the stored value digital resource; and executing, by the computer system, an action to permit or deny using the stored value digital resource by the first user via a second UI of the computer system based on the fraud assessment output.

9. The method of claim 8, wherein the time of the creation of the stored value digital resource is determined based on account information for one of the funding instrument or an account associated with the second user.

10. The method of claim 8, wherein the executing the action comprises one of:

allowing the first user to claim the stored value digital resource using an account; or disallowing the first user from claiming the stored value digital resource and reporting one of the first user or the unique digital identifier as fraudulent.

11. The method of claim 8, further comprising:

determining, by the computer system, account information for an account used by the first user, wherein the determining whether the first user has the indication of fraud is based on the account information.

12. The method of claim 11, wherein the account information includes at least one of one or more past IP addresses used by the account, one or more gift cards associated with the account, or one or more geo-locations associated with the account.

13. The method of claim 8, wherein at least one of the plurality of classification features are associated with gift card redemptions of gift cards corresponding to stored value digital resources.

14. The method of claim 8, wherein the determining whether the first user has an indication of fraud is based on at least one of a session IP address, browser information, or a browser input associated with a user device of the first user used to access the first UL.

15. The method of claim 8, wherein the executing the action comprises moving the stored value digital resource to an account of one of the first user or the second user.

16. A non-transitory computer-readable medium having stored thereon instructions that, when executed by a processor of a computer system, cause the processor of the computer system to perform operations comprising:

detecting an indication of a request to use a stored digital value by a first user device of a first user via a user interface (UI) element electronically presented in a first UI of an application of an online transaction processor that facilitates uses of stored digital values, wherein the UI element is associated with a navigation link to the application, and wherein the indication is associated with a selection of the navigation link via the UI element that causes the first user device to be directed to the first UI in the application;

determining fraud data associated with the first user based on a first user device identifier of the first user device;

accessing, in real-time, the fraud data and the historical data, wherein the fraud data and the historical data are current at a time of the request;

processing the fraud data and the historical data using a machine learning engine, wherein the processing is further based on factors and weights applied to the fraud data and the historical data, and wherein the processing comprises:

determining data for input features of the machine learning engine based on the fraud data and the historical data, executing the machine learning engine based on the data, the input features, and a machine learning process of the machine learning engine, and outputting a fraud assessment based on the executing and a fraud threshold associated with the request; and based on the fraud assessment, redirecting the first UI to one of a second UI or a third UI based on the request, wherein the second UI facilitates redeeming the stored digital value responsive to the request, and wherein the third UI facilitates preventing access to the stored digital value responsive to the request.

17. The non-transitory computer-readable medium of claim 16, wherein the fraud data is associated with whether an account of the first user has been used for fraud since the time of the creation of the stored digital value.

18. The non-transitory computer-readable medium of claim 16, wherein the operations further comprise:

executing an action to move the stored value digital resource to one or more accounts based on the fraud assessment.

19. The non-transitory computer-readable medium of claim 16, wherein the historical data comprises account data for the account of the second user.

20. The non-transitory computer-readable medium of claim 16, wherein the executing the machine learning engine comprises classifying the input features for the fraud assessment based on the machine learning process.

* * * * *